United States Patent
Ohtomo et al.

(10) Patent No.: US 10,800,344 B2
(45) Date of Patent: Oct. 13, 2020

(54) AERIAL PHOTOGRAMMETRIC DEVICE AND AERIAL PHOTOGRAMMETRIC METHOD

(71) Applicant: TOPCON Corporation, Tokyo-to (JP)

(72) Inventors: Fumio Ohtomo, Saitama (JP); Kaoru Kumagai, Tokyo-to (JP)

(73) Assignee: TOPCON Corporation, Tokyo-to (JP)

( * ) Notice: Subject to any disclaimer, the term of this patent is extended or adjusted under 35 U.S.C. 154(b) by 313 days.

(21) Appl. No.: 15/808,976

(22) Filed: Nov. 10, 2017

(65) Prior Publication Data

US 2018/0147998 A1 May 31, 2018

(30) Foreign Application Priority Data

Nov. 25, 2016 (JP) .................. 2016-228708

(51) Int. Cl.
*B60R 11/04* (2006.01)
*B64C 39/02* (2006.01)
(Continued)

(52) U.S. Cl.
CPC ............ *B60R 11/04* (2013.01); *B64C 39/024* (2013.01); *G03B 15/006* (2013.01);
(Continued)

(58) Field of Classification Search
CPC .... B60R 11/04; G03B 15/006; G05D 1/0858; G05D 1/0094; G05D 1/101; G05D 1/102; B64C 39/024; B64C 2201/127; B64C 2201/146; B64C 2201/141; B64C 2201/123; B64D 47/08; G06T 7/11;
(Continued)

(56) References Cited

U.S. PATENT DOCUMENTS 9,805,261 B1 * 10/2017 Loveland ........... G06K 9/00637
2005/0286760 A1 12/2005 Ohtomo et al.
(Continued)

FOREIGN PATENT DOCUMENTS

JP    2006-10376 A    1/2006
JP    2009-210388 A   9/2009
(Continued)

*Primary Examiner* — Nga X Nguyen
(74) *Attorney, Agent, or Firm* — Nields, Lemack & Frame, LLC (57) ABSTRACT

An aerial photogrammetric device comprises an aerial vehicle configured to fly autonomously or remotely controlled, an image pickup device provided on the aerial vehicle and having an optical axis extending in a vertical direction, an attitude detecting device for detecting a tilt angle and a tilting direction with respect to a horizontality or a verticality of the optical axis, a position measuring device, and a control device for controlling a flight of the aerial vehicle, wherein the control device is configured to acquire images at two points by the image pickup device, acquire image acquiring positions at a time of image acquisition from the position measuring device, acquire a detection result of the attitude detecting device at the time of image acquisition, correct the images acquired at the two points into horizontal images based on the detection result, and perform a relative orientation of the obtained horizontal images.

7 Claims, 5 Drawing Sheets

(51) Int. Cl.
*G03B 15/00* (2006.01)
*G05D 1/08* (2006.01)
*G05D 1/00* (2006.01)

(52) U.S. Cl.
CPC ......... *G05D 1/0094* (2013.01); *G05D 1/0858* (2013.01); *B64C 2201/127* (2013.01); *B64C 2201/146* (2013.01)

(58) Field of Classification Search
CPC . G06T 2207/10032; G06T 2207/10012; G06T 2207/30168; G06T 7/0002; G06T 5/002; H04N 5/23296; H04N 5/247; H04N 13/00; H04N 5/2351; H04N 5/2258; H04N 5/2171; H04N 13/239; H04N 17/002; G06K 9/0063
See application file for complete search history.

(56) References Cited

U.S. PATENT DOCUMENTS

| | | |
|---|---|---|
| 2009/0225161 A1 | 9/2009 | Otani et al. |
| 2012/0173053 A1* | 7/2012 | Ohtomo ................ G01C 11/04 701/4 |
| 2013/0135440 A1* | 5/2013 | Ohtomo ................ G03B 35/02 348/46 |
| 2016/0238708 A1 | 8/2016 | Ohtomo et al. |
| 2019/0004543 A1* | 1/2019 | Kennedy ............ H04N 5/23296 |

FOREIGN PATENT DOCUMENTS

| | | |
|---|---|---|
| JP | 2012-140101 A | 7/2012 |
| JP | 2013-108927 A | 6/2013 |
| JP | 2016-20910 A | 2/2016 |
| JP | 2016-151423 A | 8/2016 |

* cited by examiner

AERIAL PHOTOGRAMMETRIC DEVICE AND AERIAL PHOTOGRAMMETRIC METHOD

TECHNICAL BACKGROUND

The present invention relates to an aerial photogrammetric device and an aerial photogrammetric method using an unmanned aerial vehicle (UAV).

In a photography from the air above or a surveying from the air above, an information which cannot be acquired by the photography on the ground or an information which cannot be acquired by the surveying on the ground can be acquired, or the photography becomes possible in an off-limits area and an information of the area where the surveying is difficult can be acquired. Further, in recent years, an improvement in performance of a small air vehicle such as a remotely-controlled small type airplane or a small type helicopter, an improvement in a remote control technology, and further, an improvement in performance of an image pickup device and a promotion of miniaturization, and the like, have enabled mounting the image pickup device in a small air vehicle, performing an unmanned photography from the air above by a remote control, and further carrying out the photogrammetry using the acquired photographs.

When performing the photogrammetry, an orientation operation between images is required, tilts and rotations of the images are calculated, the orientation operation is carried out, and further, by carrying out an absolute orientation, a three-dimensional measurement of a ground surface is performed. However, the orientation operation between images is a complicated operation, and skill is required for insuring a high accuracy.

SUMMARY OF THE INVENTION

It is an object of the present invention to provide an aerial photogrammetric device and an aerial photogrammetric method which can simplify the orientation operation.

To attain the object as described above, an aerial photogrammetric device according to the present invention comprises an aerial vehicle configured to fly autonomously or remotely controlled, an image pickup device provided on the aerial vehicle and having an optical axis extending in a vertical direction, an attitude detecting device for detecting a tilt angle and a tilting direction with respect to a horizontality or a verticality of the optical axis, a position measuring device, and a control device for controlling a flight of the aerial vehicle, wherein the control device is configured to acquire images at two points by the image pickup device, acquire image acquiring positions at a time of image acquisition from the position measuring device, acquire a detection result of the attitude detecting device at the time of image acquisition, correct the images acquired at the two points into horizontal images based on the detection result, and perform a relative orientation of the obtained horizontal images.

Further, in the aerial photogrammetric device according to the present invention, the attitude detecting device has a tilt sensor, wherein the tilt sensor includes a first tilt sensor with a high accuracy and a second tilt sensor with a high responsiveness, wherein the attitude detecting device has comparison data of a comparison result of a detection result of the first tilt sensor and a detection result of the second tilt sensor, and is configured in such a manner that a detection result to be outputted is the detection result of the second tilt sensor calibrated based on the comparison data.

Further, in the aerial photogrammetric device according to the present invention, the position measuring device is a GNSS device provided on the aerial vehicle.

Further, in the aerial photogrammetric device according to the present invention, the position measuring device is a retro-reflector provided on the aerial vehicle and a total station provided at a predetermined position on a ground.

Further, an aerial photogrammetric method according to the present invention includes a position measuring device, an aerial vehicle configured to fly autonomously or remotely controlled, an image pickup device provided on the aerial vehicle and having an optical axis extending in a vertical direction, and an attitude detecting device for detecting a tilt angle and a tilting direction with respect to a horizontality or a verticality of the optical axis, comprising a step of acquiring images at two points by the image pickup device, a step of acquiring image acquiring positions at a time of image acquisition from the position measuring device, a step of acquiring a detection result of the attitude detecting device at the time of image acquisition and of correcting the images acquired at the two points into horizontal images based on the detection result, and a step of performing a relative orientation of the obtained horizontal images.

Further, in the aerial photogrammetric method according to the present invention, the position measuring device is a GNSS device provided on the aerial vehicle.

Furthermore, in the aerial photogrammetric method according to the present invention, the position measuring device is a retro-reflector provided on the aerial vehicle and a total station provided at a predetermined position on a ground.

According to the present invention, an aerial photogrammetric device comprises an aerial vehicle configured to fly autonomously or remotely controlled, an image pickup device provided on the aerial vehicle and having an optical axis extending in a vertical direction, an attitude detecting device for detecting a tilt angle and a tilting direction with respect to a horizontality or a verticality of the optical axis, a position measuring device, and a control device for controlling a flight of the aerial vehicle, wherein the control device is configured to acquire images at two points by the image pickup device, acquire image acquiring positions at a time of image acquisition from the position measuring device, acquire a detection result of the attitude detecting device at the time of image acquisition, correct the images acquired at the two points into horizontal images based on the detection result, and perform a relative orientation of the obtained horizontal images. As a result, a rotation angle with respect to the verticality or the horizontality of the optical axis at the time of image acquisition becomes already known, unknown numbers at the time of relative orientation are reduced, and the relative orientation operation becomes easy.

Further, according to the present invention, an aerial photogrammetric method in an aerial photogrammetric device includes a position measuring device, an aerial vehicle configured to fly autonomously or remotely controlled, an image pickup device provided on the aerial vehicle and having an optical axis extending in a vertical direction, and an attitude detecting device for detecting a tilt angle and a tilting direction with respect to a horizontality or a verticality of the optical axis, comprising a step of acquiring images at two points by the image pickup device, a step of acquiring image acquiring positions at a time of image acquisition from the position measuring device, a step of acquiring a detection result of the attitude detecting device at the time of image acquisition and of correcting the images acquired at the two points into horizontal images based on the detection result, and a step of performing a relative orientation of the obtained horizontal images. As a result, unknown numbers at the time of relative orientation are reduced, and the relative orientation operation becomes easy.

DETAILED DESCRIPTION OF THE PREFERRED EMBODIMENT

A description will be given below on embodiments of the present invention by referring to the attached drawings.

Figure 1:
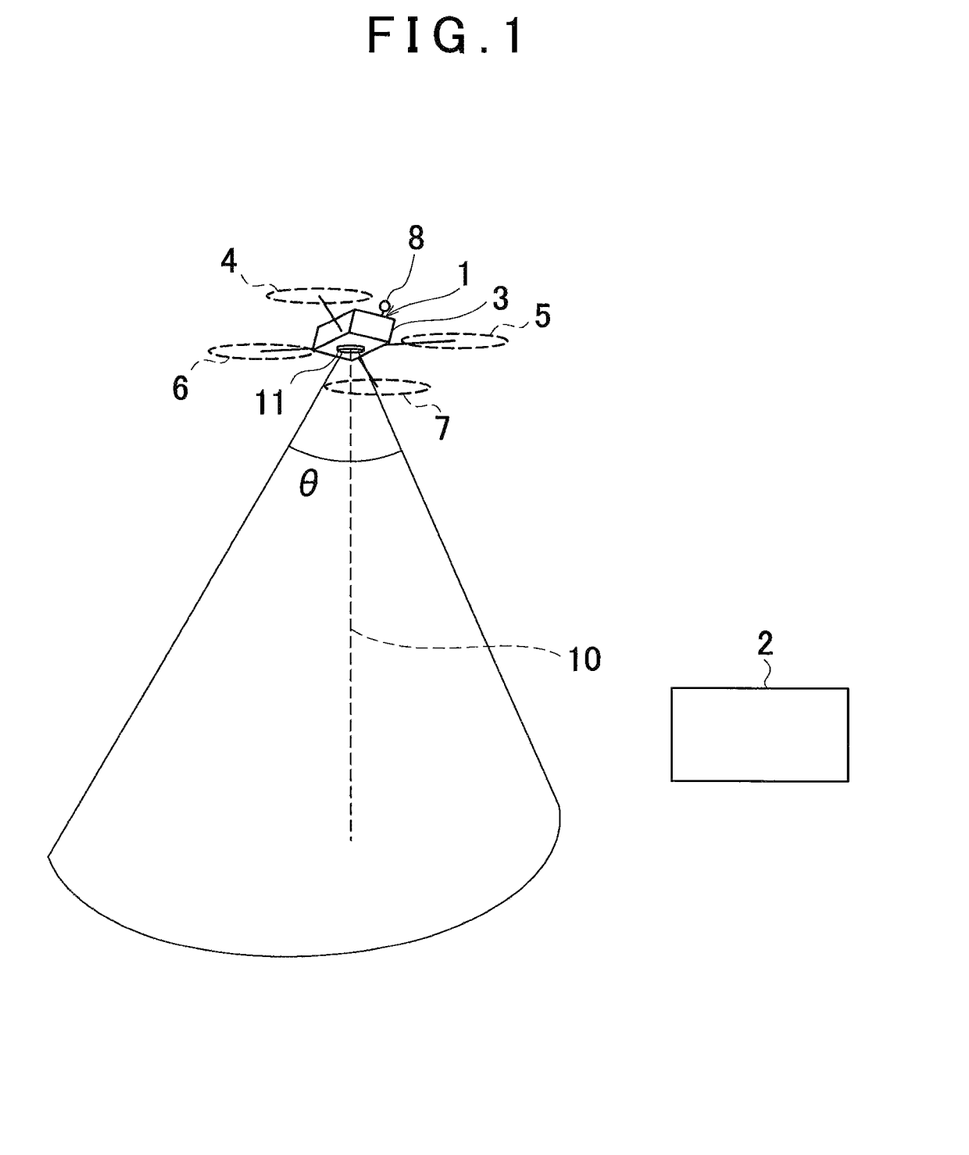
FIG. 1 is a system schematic block diagram according to an embodiment of the present invention.

FIG. 1 shows a system schematic block diagram of an embodiment according to the present invention, and in FIG. 1, reference numeral 1 denotes an unmanned aerial vehicle (hereinafter, referred as "UAV 1") which can autonomously fly or can be remotely controlled, reference numeral 2 denotes a base station control device installed on the ground, and the base station control device 2 is capable of performing a data communication with the UAV 1, performs controlling the flight of the UAV 1, setting and changing a flight plan, stores and manages an information collected by the UAV 1, and further, executes a three-dimensional measurement of a range to be measured based on the stored information.

Figure 2:
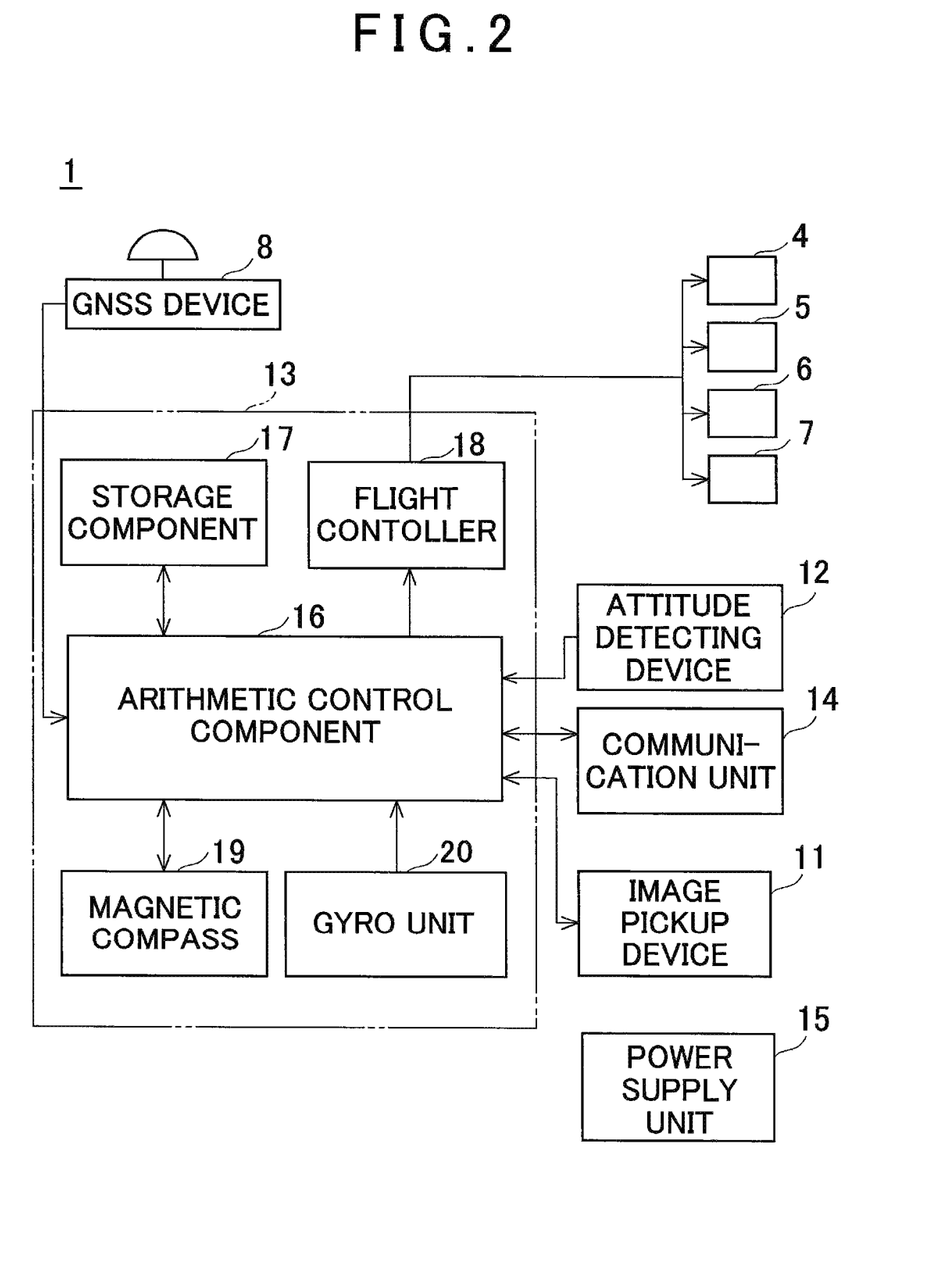
FIG. 2 is a schematic block diagram of a UAV used in the present embodiment.

FIG. 2 shows a schematic block diagram of the UAV 1.

The UAV 1 is, for instance, a helicopter as a small air vehicle which autonomously flies. The UAV 1 is remotely controlled from the base station control device 2, or a flight plan is set to a control device (to be described later) of the UAV 1 from the base station control device 2, and the UAV autonomously flies in accordance with the flight plan.

In the UAV 1, respective propeller units 4, 5, 6 and 7 are provided at forward ends of a necessary number (preferably an even number, four in the drawing) of frames designed in a rod-like shape, radially extending from a machine body 3. The propeller units 4, 5, 6 and 7 are configured in such a manner that the driving of the propeller units 4, 5, 6 and 7 are independently controlled. The propeller units 4, 5, 6 and 7 and a flight controller (to be described later) which controls the driving of the propeller units 4, 5, 6 and 7, or the like, make up a navigating means of an aerial vehicle.

By controlling the propeller units 4, 5, 6 and 7 individually, a desired flight such as ascending, descending, turning, advancing, backing up, hovering, and the like, can be performed.

As a position measuring device which measures a position of the UAV 1, a GNSS (Global Navigation Satellite System) device 8 is mounted on the machine body 3 of the UAV 1.

The GNSS device 8 is configured to measure a reference position of the UAV 1, for instance, a machine center, the GNSS device 8 measures a three-dimensional absolute coordinate of the reference position, and a measurement value shows a ground coordinate system and an altitude obtained from a geocentric coordinate system (an absolute coordinate system).

As shown in FIG. 2, in addition to the GLASS device 8, an image pickup device 11, a posture detecting device 12, a control device 13, a communication unit 14, a power supply unit 15, and the like are mounted on the UAV 1.

The image pickup device 11 acquires a digital image and outputs a digital signal as an image signal. The image pickup device 11 may be a camera which photographs still images at predetermined time intervals or a video camera which takes images continuously. Further, a commercially available digital camera or a video camera may be used.

The image pickup device 11 is provided on a lower surface of the machine body 3. The image pickup device 11 has an optical axis 10 which extends in a vertically downward direction under a condition where the UAV 1 takes a horizontal attitude. Further, an image pickup device which photographs an advancing direction may be further added. It is to be noted that an optical axis of the additional image pickup device is set to be horizontal when the optical axis 10 of the image pickup device 11 is vertical, or set as tilted at a known angle with respect to the horizontality.

Further, as an image pickup element, the image pickup device 11 has a CCD or a CMOS sensor which are an aggregations of pixels, and is configured in such a manner that the optical axis 10 of the image pickup device 11 runs through a center of the image pickup element (a coordinate center of a light receiving surface). The image pickup element has a coordinate system with the center of the image pickup element as an origin, a position (a coordinate) of each pixel on the image pickup element can be specified by the coordinate system, and further, a field angle of each pixel (an angle formed between a ray entering the pixel through an image forming lens and the optical axis 10) can be recognized from the coordinate.

The optical axis 10 is set so as to run through the reference position of the machine body 3 (for instance, the machine center). The image pickup device 11 has a view angle which is an angle θ, and can acquire an image for an aerial photograph. Therefore, the image pickup device 11 can acquire an image in a range of the necessary view angle θ immediately below the UAV 1, and further, is set so that a center of the image coincides with the reference position. Further, an image photographed by the image pickup device 11 is also used as image data for position measurement as will be described later.

A time when photographed by using the image pickup device 11 is acquired from the GNSS device 8. Each photographed image is associated with the photographing time and a geocentric coordinate (a three-dimensional coordinate) measured by the GNSS device 8, and stored in a storage component 17 (to be described later).

Figure 3:
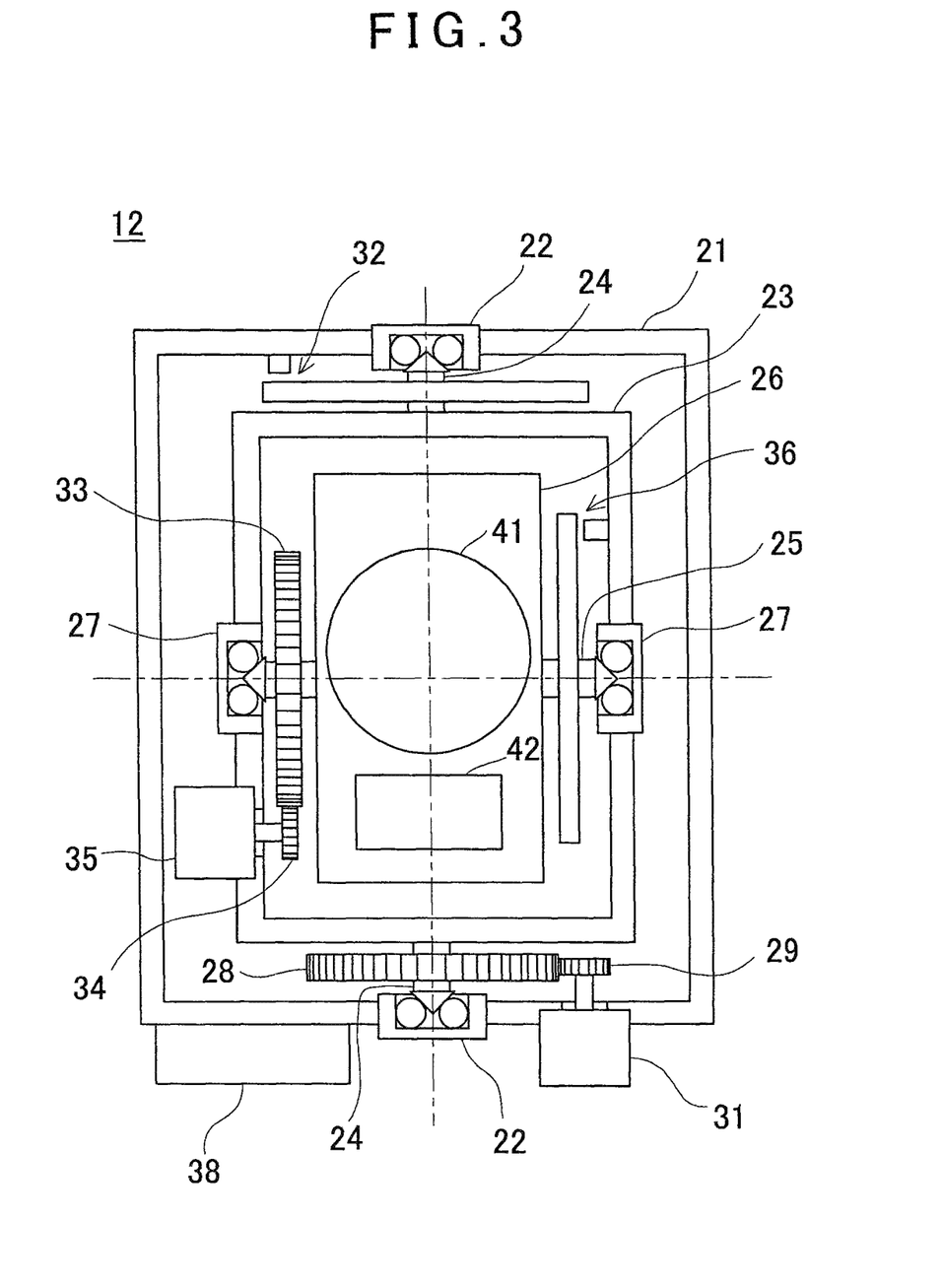
FIG. 3 is a plan view of an attitude detecting device used in the present embodiment.
Figure 4:
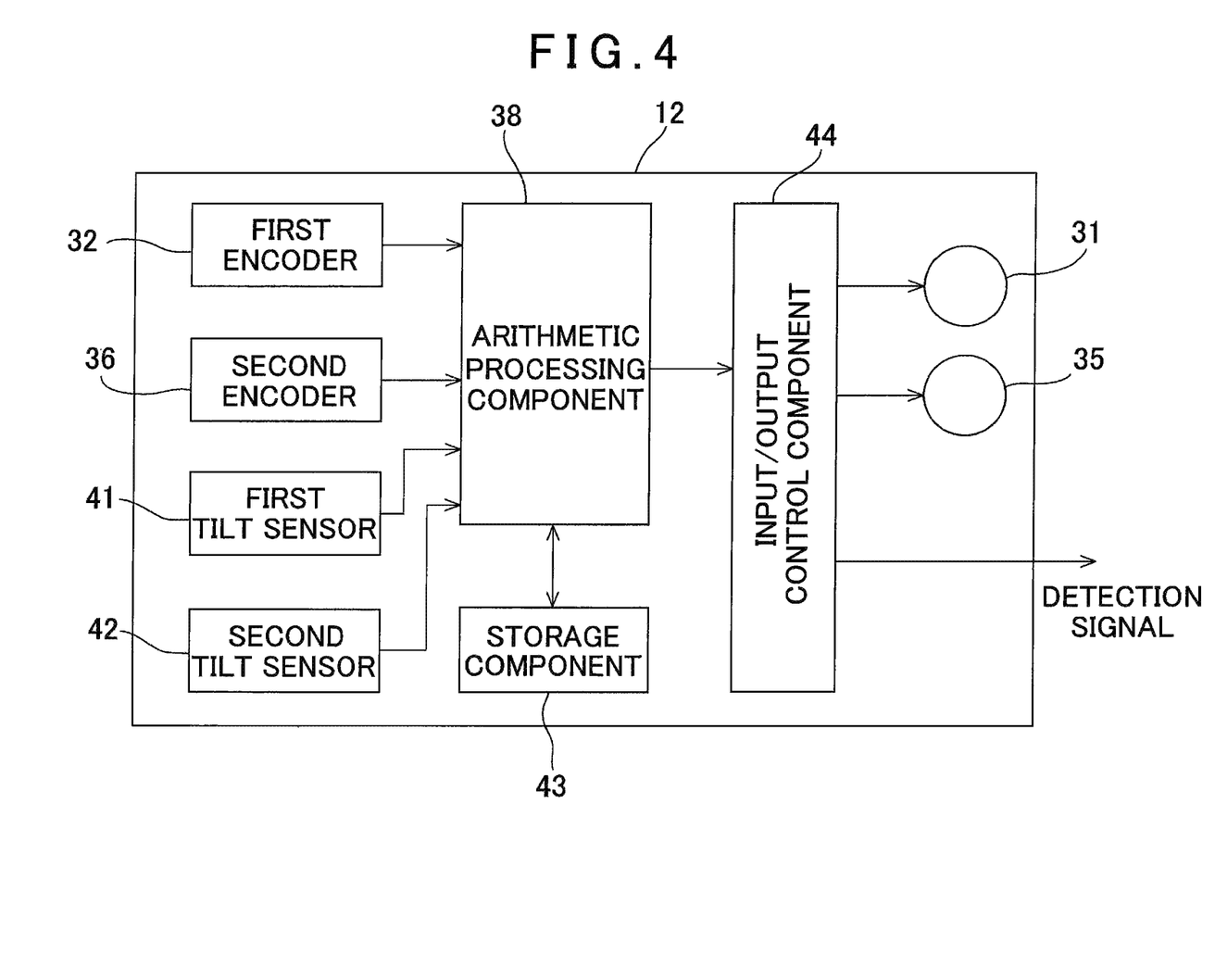
FIG. 4 is a block diagram of the attitude detecting device.

FIG. 3 and FIG. 4 show the attitude detecting device 12.

It is to be noted that FIG. 3 shows a plan view of when the attitude detecting device 12 takes a horizontal attitude. In the following description, the upper and lower sides correspond to the upper and lower sides in the drawing and the left and right sides correspond to the left and right sides in the drawing.

An inner frame 23 with a rectangular frame shape is provided inside an outer frame 21 with a rectangular frame shape, and a tilt detecting unit 26 is provided inside the inner frame 23.

From an upper surface and a lower surface of the inner frame 23, longitudinal shafts 24 and 24 are protruded. The longitudinal shafts 24 and 24 are rotatably fitted with bearings 22 and 22 as provided on the outer frame 21. The longitudinal shafts 24 and 24 have a longitudinal axis, and the inner frame 23 is capable of rotating 360° in a left-and-right direction around the longitudinal shafts 24 and 24 as the center.

The tilt detecting unit 26 is supported by a lateral shaft 25, and both end portions of the lateral shaft 25 are rotatably fitted with bearings 27 and 27 provided on the inner frame 23. The lateral shaft 25 has a lateral axis perpendicularly crossing the longitudinal axis, and the tilt detecting unit 26 is capable of rotating freely by 360° in an up-and-down direction a vertical direction around the lateral shaft 25 as the center.

That is, the tilt detecting unit 26 is configured to be supported via a gimbal mechanism, which is capable of rotating freely by 360° in two axial directions with respect to the outer frame 21.

On one of the longitudinal shafts 24 and 24, for instance, a first gear 28 is attached to the lower longitudinal shaft 24, and a first driving gear 29 meshes with the first gear 28. Further, a first motor 31 is provided on a lower surface of the outer frame 21, and the first driving gear 29 is attached to an output shaft of the first motor 31.

On the other of the longitudinal shafts 24 and 24, a first encoder 32 is attached. The first encoder 32 is configured to detect a rotation angle in the left-and-right direction of the inner frame 23 with respect to the outer frame 21.

On one end of the lateral shaft 25, a second gear 33 is attached, and a second driving gear 34 meshes with the second gear 33. Further, on a side surface (left side surface in the figure) of the inner frame 23, a second motor 35 is attached, and the second driving gear 34 is attached to an output shaft of the second motor 35.

On the other end of the lateral shaft 25, a second encoder 36 is attached. The second encoder 36 is configured to detect a rotation angle in the up-and-down direction of the tilt detecting unit 26 with respect to the inner frame 23.

The first encoder 32 and the second encoder 36 are electrically connected to an arithmetic processing component 38.

The tilt detecting unit 26 has a first tilt sensor 41 and a second tilt sensor 42, and the first tilt sensor 41 and the second tilt sensor 12 are electrically connected to the arithmetic processing component 38.

Further description will be given on the attitude detecting device 12 by referring to FIG. 4.

The attitude detecting device 12 includes the first encoder 32, the second encoder 36, the first tilt sensor 41, the second tilt sensor 42, the arithmetic processing component 38, the first motor 31, and the second motor 35. Further, the attitude detecting device 12 includes a storage component 43 and an input/output control component 44.

In the storage component 43, programs such as a calculation program for an attitude detection and the like, and data such as calculation and the like are stored.

The input/output control component 44 drives the first motor 31 and the second motor 35 based on a control instruction output from the arithmetic processing component 38 and outputs a result of a tilt detection calculated by the arithmetic processing component 38 as a detection signal.

The first tilt sensor 41 is for detecting the horizontality with high accuracy, for instance, a tilt detector in which a detection light incidents to a horizontal liquid surface and the horizontality is detected according to a change of a reflection angle of a reflected light, or a bubble tube which detects a tilting according to a positional change of an air bubble sealed in a tube. Further, the second tilt sensor 42 is for detecting detects a change in tilt with high responsiveness, for instance, an acceleration sensor.

It is to be noted that both the first tilt sensor 41 and the second tilt sensor 12 can individually detect tiltings in the two axial directions, which are a rotating direction (a tilting direction) detected by the first encoder 32 and a rotating direction (a tilting direction) detected by the second encoder 36.

The arithmetic processing component 38 calculates a tilt angle and a tilting direction based on the detection results from the first tilt sensor 41 and the second tilt sensor 42, and further calculates a tilt angle of the optical axis 10 with respect to the verticality (or the horizontality) based on a rotation angle of the first encoder 32 and a rotation angle of the second encoder 36, which correspond to the tilt angle and the tilting direction.

It is to be noted that in a case where the outer frame 21 is installed horizontally, the attitude detecting device 12 is set in such a manner that the first tilt sensor 41 detects the horizontal, and further, is set in such a manner that an output of the first encoder 32 and an output of the second encoder 36 both indicate a reference position (rotation angle at 0°).

A description will be given below on an operation of the attitude detecting device 12.

First, a description will be given below on a case where a tilting is detected with high accuracy.

A case where a tilt is detected with high accuracy is, for instance, a static case or a case where a tilt change is slow as the first tilt sensor 41 can follow the change of tilting.

When the attitude detecting device 12 is tilted, the first tilt sensor 41 outputs a signal corresponding to a tilting.

The arithmetic processing component 38 calculates a tilt angle and a tilting direction based on the signal from the first tilt sensor 41 and further calculates rotation amounts of the first motor 31 and the second motor 35 in order to make the tilt angle and the tilting direction to zero based on a calculation result. The arithmetic processing component 38 outputs a driving command for driving the first motor 31 and the second motor 35 by the rotation amounts via the input/output control component 44.

The first motor 31 and the second motor 35 are driven so as to be tilted reversibly to the tilt angle and the tilting direction as calculated by driving of the first motor 31 and the second motor 35. The rotation amounts (rotation angles) of the motors are detected by the first encoder 32 and the second encoder 36 respectively, and the driving of the first motor 31 and the second motor 35 is stopped when the rotation angles reach the calculation results.

In this state, under the condition where the outer frame 21 is tilted, the tilt detecting unit 26 is controlled to be horizontal.

Therefore, in order to make the tilt detecting unit 26 horizontal, the tilt angle and the tilting direction, at which the inner frame 23 and the tilt detecting unit 26 are tilted by the first motor 31 and the second motor 35, are acquired based on the rotation angles detected by the first encoder 32 and the second encoder 36.

The arithmetic processing component 38 calculates the tilt angle and the tilting direction of the attitude detecting device 12 based on the detection results of the first encoder 32 and the second encoder 36 when the first tilt sensor 41 detects the horizontal. The calculation result indicates the attitude of the attitude detecting device 12 after the attitude detecting device 12 is tilted.

The arithmetic processing component 38 outputs the calculated tilt angle and the tilting direction to the control device 13 via the input/output control component 44 as a detection signal of the attitude detecting device 12.

In the attitude detecting device 12, as a structure shown in FIG. 3, there is nothing which restricts rotations of the tilt detecting unit 26 and the inner frame 23. Therefore, the tilt detecting unit 26 and the inner frame 23 can both rotate by 360° or more. That is, no matter what attitude the attitude detecting device 12 takes (even in a case where the attitude detecting device 12 is upside down, for instance), the attitude detection in all directions can be performed.

In the attitude detection, in a case where high responsiveness is required, although the attitude detection and an attitude control are performed based on the detection result of the second tilt sensor 42, the second tilt sensor 42 has a poorer detection accuracy than the first tilt sensor 41 in general.

In the attitude detecting device 12, by including the first tilt sensor 41 with high accuracy and the second tilt sensor 42 with high responsiveness, the attitude control is performed based on the detection results of the second tilt sensor 42, and the attitude detection with high accuracy can be performed by the first tilt sensor 41.

That is, based on the tilt angle as detected by the second tilt sensor 42, the first motor 31 and the second motor 35 are driven so that the tilt angle becomes 0°. Further, by continuing the driving of the first motor 31 and the second motor 35 until the first tilt sensor 41 detects the horizontal, the attitude can be detected with high accuracy. If a deviation occurs between values of the first encoder 32 and the second encoder 36 when the first tilt sensor 41 detects the horizontal, that is, an actual tilt angle, and the tilt angle as detected by the second tilt sensor 42, the tilt angle of the second tilt sensor 42 can be calibrated based on the deviation.

Therefore, by obtaining a relationship between a detected tilt angle of the second tilt sensor 42 and a tilt angle which is obtained based on the horizontal detection by the first tilt sensor 41 and the detection result of the first encoder 32 and the second encoder 36 in advance, the tilt angle detected by the second tilt sensor 42 can be calibrated. Thereby, the accuracy of the attitude detection with high responsiveness by the second tilt sensor 42 can be improved.

Further, the arithmetic processing component 38 controls the first motor 31 and the second motor 35 based on a signal from the second tilt sensor 42 when a fluctuation in a tilt is large and when a change in a tilt is rapid.

Further, the arithmetic processing component 38 controls the first motor 31 and the second motor 35 based on a signal from the first tilt sensor 41 when the fluctuation in the tilt is small and when the change in the tilt is slow, that is, in a condition where the first tilt sensor 41 is capable of following up.

It is to be noted that the storage component 43 stores comparison data which is a data table showing a comparison result of a detection result of the first tilt sensor 41 and a detection result of the second tilt sensor 42. In a case where the first motor 31 and the second motor 35 are controlled based on a signal from the second tilt sensor 42, the arithmetic processing component 38 calibrates the detection result provided by the second tilt sensor 42 based on the comparison data. By this calibration, it is possible to improve the detection result provided by the second tilt sensor 12 to the detection accuracy of the first tilt sensor 41. Thus, in the attitude detection performed by the attitude detecting device 12, a high responsiveness can be realized while maintaining a high accuracy.

By synthesizing the calculated rotation angle of the first encoder 32 and the calculated rotation angle of the second encoder 36, a tilt angle and a tilting direction are calculated in real time. The tilt angle and the tilting direction correspond to a tilt angle and a tilting direction of the optical axis 10 with respect to a verticality (or a horizontality).

Thus, the first motor 31, the second motor 35, the first encoder 32, the second encoder 36 and the arithmetic processing component 38 constitute a relative tilt angle detecting unit.

Next, a description will be given on the control device 13. The control device 13 has an arithmetic control component 16, the storage component 17, a flight controller 18, a magnetic compass 19 and a gyro unit 20.

In the storage component 17 the image acquired by the image pickup device 11 and a time at which the image is acquired are stored in such a manner that the time is associated with the image, and further, three-dimensional coordinates of the UAV 1 are determined by the GNSS device 8 in synchronization with the time at which the image is acquired, and it is arranged so that the determined three-dimensional coordinate are also associated with the time at which the image is acquired and stored in the storage component 17.

Further, in the storage component 17, various types of programs such as an image pickup control program, an image processing program, a three-dimensional position measuring program, an image correcting program, a matching processing program, a calculation program, a flight control program, a flight attitude control program, a communication control program, and the like, are stored.

Further, in the storage component 17, the image taken by the image pickup device 11, a time when the image is taken and three-dimensional coordinates when the image is acquired in association with the image, and also stores a flight plan data, are stored. It is to be noted that the data included in the flight plan data are, for instance, a flight course, a flight altitude, a place to be photographed, a range, and the like.

Based on a position of the UAV 1 measured by the GNSS device 8, on a flight velocity of the UAV 1 and on a view angle θ of the image pickup device 11, and the like, the image pickup control program controls the acquisition timing of the image data taken by the image pickup device 11 in such a manner that the images adjacent to each other in terms of time overlap at a predetermined rate and that the images taken at vertexes (to be described later) adjacent to each other overlap at a predetermined rate. It is to be noted that, when performing the image tracking, the image pickup device 11 is controlled so that the image pickup device 11 takes the image at the predetermined time intervals between the image data and the next image data acquired. It is to be noted that video images may be acquired as images for tracking to be acquired between the image data and the next image data.

The image processing program extracts a feature point (a tie point) from the image acquired by the image pickup device 11.

The three-dimensional position measuring program calculates a three-dimensional position of the UAV 1 from the time and the positional information acquired by the GNSS device 8, and converts a measurement result of photogrammetry to a geocentric coordinate based on the three-dimensional position of the UAV 1.

The image correcting program corrects the image taken by the image pickup device 11 to a horizontal image based on a detection result of the attitude detecting device 12.

The flight attitude control program performs an attitude control of the UAV 1 based on the detection signals from the magnetic compass 19 and the gyro unit 20, and further performs an attitude control of the UAV 1 in such a manner that the optical axis 10 becomes approximately vertical at the time of image acquisition performed by the image pickup device 11.

A description will be given below on an operation of the embodiment according to the present invention.

The arithmetic control component 16 sends out a flight control signal to the flight controller 18 in accordance with the flight control program, the flight attitude control program and the flight plan data, and the flight controller 18 drives and controls the propeller units 4, 5, 6 and 7 by using the flight control signal.

The flight controller 18 controls an attitude and a flight condition of the UAV 1 based on the detection signals from the magnetic compass 19 and the gyro unit 20, and the arithmetic control component 16 makes the UAV 1 fly in a set flight course and at a set flight altitude in accordance with the flight plan data via the flight controller 18.

During the flight, the attitude detecting device 12 detects a tilt angle and a tilting direction in real time, the detected tilt angle and the tilting direction are a tilt angle and a tilting direction of the optical axis 10 with respect to the verticality (or the horizontality), and a detection result is associated with an image acquired by the image pickup device 11 and an acquisition time of the image acquired by the GNSS device 8 and stored in the storage component 17.

Further, at the time of the photogrammetry, the arithmetic control component 16 corrects the acquired image to a horizontal image based on a detection result of the attitude detecting device 12 and the image correcting program.

Figure 5:
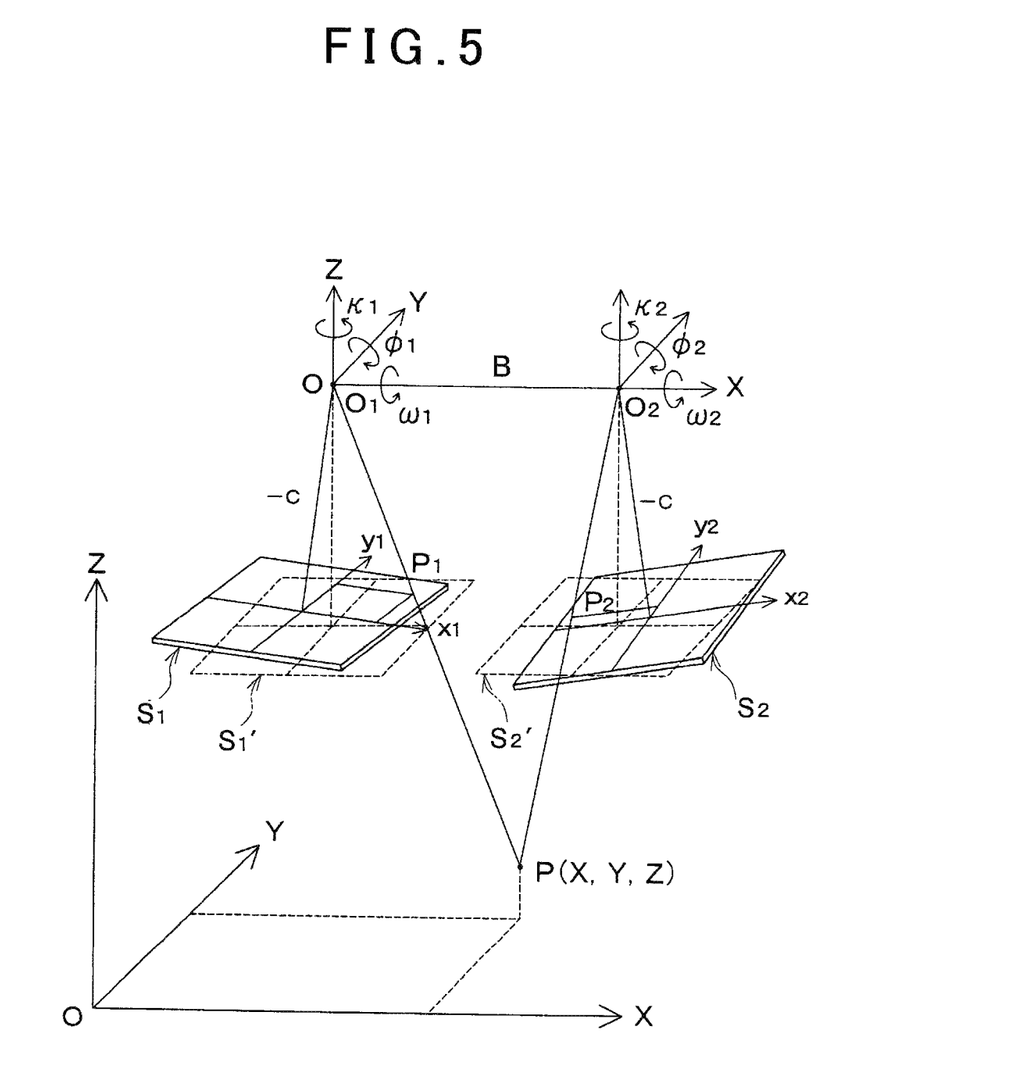
FIG. 5 is a conceptual diagram of a relative orientation.

FIG. 5 shows a case where a stereo image for the photogrammetry is prepared from two still images S1 and S2.

Although the UAV 1 is controlled approximately horizontally by the flight controller 18, an attitude of the UAV 1 is unstable and the optical axis 10 is tilted in three axial directions.

In a case where the images are acquired at two points, the directions of the cameras are determined by $\phi$, $\omega$ and $\kappa$.

Therefore, the directions of the cameras at the two points are each expressed as $\phi1$, $\omega1$, $\kappa1$, $\phi2$, $\omega2$, and $\kappa2$.

Here, $\kappa1$ denotes a rotation angle of a Z axis of a left camera,
$\phi1$ denotes a rotation angle of a Y axis of the left camera,
$\omega1$ denotes a rotation angle of an X axis of the left camera,
$\kappa2$ denotes a rotation angle of a Z axis of a right camera,
$\phi2$ denotes a rotation angle of a Y axis of the right camera, and
$\omega2$ denotes a rotation angle of an X axis of the right camera.

In a general relative orientation, $\phi1$, $\omega1$, $\kappa1$, $\phi2$, $\omega2$ and $\kappa2$ are unknowns, $\phi1$, $\omega1$, $\kappa1$, $\phi2$, $\omega2$ and $\kappa2$ are calculated based on the common points (the tie points) in the two images, and in this case, the number of necessary common points is six or more.

As shown in FIG. 5, an origin point of a model coordinate system is taken on a projection center O1 on the left side, and a line connecting O1 with a projection center O2 on the right side is taken as an X axis. A scale size takes a base line length as a unit length.

The parameters to be obtained at this moment are the rotation angle $\kappa1$ of the Z axis, the rotation angle $\phi1$ of the Y axis and the rotation angle $\omega1$ of the X axis of the left camera, and the rotation angle $\kappa2$ of the Z axis, the rotation angle $\phi2$ of the Y axis, and the rotation angle $\omega2$ of the X axis of the right camera.

The tilt and the tilting direction of the optical axis 10 to the verticality (or the horizontality) at the time of the photogrammetry are detected by the attitude detecting device 12. Therefore, $\phi1$, $\omega1$, $\phi2$ and $\omega2$ are calculated by the arithmetic control component 16 and become known values.

As described above, as a process before performing the relative orientation, the control device 13 converts the still images S1 and S2 to the horizontal images respectively, based on the detection result of the attitude detecting device 12.

The relative orientation is performed with respect to the horizontal images S1' and S2'. Therefore, the unknowns in the relative orientation are only $\kappa1$ and $\kappa2$, and the calculation is greatly simplified.

Since the rotation angles $\kappa1$ and $\kappa2$ of the cameras can be calculated respectively, an absolute orientation can be performed on the horizontal image S1' and the horizontal image S2' and the horizontal image S1' and the horizontal image S2' are converted to a condition as shown by broken lines in FIG. 5. Further, by performing the absolute orientation, a three-dimensional coordinate (X, Y, Z) of a point to be measured P can be calculated from a base line length B, a focal length c of each camera, and the coordinates of the tie points P1 and P2 after the absolute orientation, and further, an altitude of the UAV 1 at each of the point O1 and the point O2 can be determined.

As described above, in the present embodiment, the tilt angle and the tilting direction of the optical axis 10 can be detected by the attitude detecting device 12 in real time. Therefore, the tilt angle and the tilting direction to the horizontality do not have to be calculated based on the images, and the relative orientation can be performed easily.

It is to be noted that the photogrammetry may be performed by the arithmetic control component 16, acquired data may be stored in the storage component 17 and the data may be transmitted to the base station control device 2 after the completion of the measurement, or the acquired image data, positional data determined by the GNSS device 8, and the like, may be transmitted to the base station control device 2 during the flight of the UAV 1, and a photogrammetry may be performed by the base station control device 2.

It is to be rioted that the embodiment as described above described a case where the optical axis 10 of the image pickup device 11 is in a vertical direction, but it is needless to say that the embodiment can be carried out likewise even if the optical axis 10 of the image pickup device 11 is in a horizontal direction.

Further, in the embodiment as described above, a GNSS device is used as a position measuring device, but it is also possible to provide a retro-reflector on the UAV 1, provide a total station having distance measuring, angle measuring and tracking functions at a predetermined position on the ground, track the retro-reflector by the total station, and determine a position of the UAV 1. In this case, the retro-reflector and the total station constitute the position measuring device.

The invention claimed is:

1. An aerial photogrammetric device comprising: an aerial vehicle configured to fly autonomously or remotely controlled, an image pickup device provided on said aerial vehicle and having an optical axis extending in a vertical direction, a gyro unit, an attitude detecting device for detecting a tilt angle and a tilting direction with respect to a horizontality or a verticality of said optical axis, a position measuring device, and a control device for controlling a flight of said aerial vehicle, wherein said control device is configured to control an attitude and a flight condition of said aerial vehicle based on signals from said gyro unit, acquire images at two points by said image pickup device, acquire image acquiring positions at a time of image acquisition from said position measuring device, acquire a detection result of said attitude detecting device at the time of image acquisition, correct said images acquired at said two points into horizontal images based on said detection result, and perform a relative orientation of said obtained horizontal images.

2. The aerial photogrammetric device according to claim 1, wherein said attitude detecting device has a tilt sensor, wherein said tilt sensor includes a first tilt sensor with a high accuracy and a second tilt sensor with a high responsiveness, wherein said attitude detecting device has comparison data of a comparison result of a detection result of said first tilt sensor and a detection result of said second tilt sensor, and is configured in such a manner that a detection result to be outputted is said detection result of said second tilt sensor calibrated based on said comparison data.

3. The aerial photogrammetric device according to claim 1, wherein said position measuring device is a GNSS device provided on said aerial vehicle.

4. The aerial photogrammetric device according to claim 1, wherein said position measuring device is a retro-reflector provided on said aerial vehicle and a total station provided at a predetermined position on a ground.

5. An aerial photogrammetric method in an aerial photogrammetric device which includes a position measuring device, an aerial vehicle configured to fly autonomously or remotely controlled, an image pickup device provided on said aerial vehicle and having an optical axis extending in a vertical direction, and an attitude detecting device for detecting a tilt angle and a tilting direction with respect to a horizontality or a verticality of said optical axis, comprising:

a step of acquiring images at two points by said image pickup device, a step of acquiring image acquiring positions at a time of image acquisition from said position measuring device, a step of acquiring a detection result of said attitude detecting device at the time of image acquisition and of correcting said images acquired at said two points into horizontal images based on said detection result, and a step of performing a relative orientation of said obtained horizontal images.

6. The aerial photogrammetric method according to claim 5, wherein said position measuring device is a GNSS device provided on said aerial vehicle.

7. The aerial photogrammetric method according to claim 5, wherein said position measuring device is a retro-reflector provided on said aerial vehicle and a total station provided at a predetermined position on a ground.

* * * * *